US012497577B2

(12) United States Patent
Ferry

(10) Patent No.: US 12,497,577 B2
(45) Date of Patent: Dec. 16, 2025

(54) METHOD OF COUNTERING MALODOUR IN A WASHING MACHINE COMPRISING THE ADDITION OF A FRAGRANCE PRECURSOR

(71) Applicant: GIVAUDAN SA, Vernier (CH)

(72) Inventor: Aurelie Ferry, Bouffémont (FR)

(73) Assignee: GIVAUDAN SA, Vernier (CH)

( * ) Notice: Subject to any disclaimer, the term of this patent is extended or adjusted under 35 U.S.C. 154(b) by 0 days.

(21) Appl. No.: 18/678,609

(22) Filed: May 30, 2024

(65) Prior Publication Data

US 2024/0309296 A1 Sep. 19, 2024

Related U.S. Application Data

(63) Continuation of application No. 17/298,374, filed as application No. PCT/EP2018/085158 on Dec. 17, 2018, now Pat. No. 12,024,690.

(51) Int. Cl.
*C11D 3/50* (2006.01)
*C11D 3/00* (2006.01)
*C11B 9/00* (2006.01)

(52) U.S. Cl.
CPC .............. *C11D 3/0068* (2013.01); *C11D 3/50* (2013.01); *C11B 9/0011* (2013.01); *C11B 9/0015* (2013.01); *C11B 9/0061* (2013.01)

(58) Field of Classification Search
CPC ....... C11D 3/0068; C11D 3/2072; C11D 3/50; C11D 3/507; C11D 7/50; C11D 9/44; C11D 9/442; C11D 2111/12
See application file for complete search history.

(56) References Cited

U.S. PATENT DOCUMENTS

2010/0331225 A1* 12/2010 Panandiker ............ C11D 3/505 510/516
2013/0316938 A1* 11/2013 Baumgartner ........ C11B 9/0003 585/24
2013/0324450 A1* 12/2013 Reichlin .................. C11D 3/50 510/103
2014/0323383 A1* 10/2014 Trujillo ................ C11D 17/043 510/439
2015/0141309 A1* 5/2015 Vaes ...................... C11D 1/645 510/516
2016/0122271 A1* 5/2016 Indradas ............... C11B 9/0061 568/426
2019/0161702 A1* 5/2019 Saveyn ................ C11D 3/2093

FOREIGN PATENT DOCUMENTS

WO 2007143873 A1 12/2007
WO 2008154765 A1 12/2008
WO 2012085287 A1 6/2012
WO 2015086522 A1 6/2015
WO 2018096176 A1 5/2018

OTHER PUBLICATIONS

International Search Report for Application No. PCT/EP2018/085158 dated Jul. 23, 2019.
Written Opinion for Application No. PCT/EP2018/085158 dated Jul. 23, 2019.
J.R. Stephens, et al., "New Compounds. Certain n-Dodecyl Sulfides", Journal of the American Chemical Society, vol. 73, No. 8, Jan. 1, 1951.

* cited by examiner

*Primary Examiner* — Charles I Boyer
(74) *Attorney, Agent, or Firm* — Curatolo Sidoti & Trillis Co., LPA; Floyd Trillis, III; Salvatore A. Sidoti

(57) ABSTRACT

A method of countering malodour in a washing machine at the end of a wash cycle, comprising the addition thereto of a fragrance precursor. The fragrance precursor may be added alone in solution, or as part of a fabric softener/conditioner. The precursor is particularly ethyl (Z)-2-acetyl-4-methyltridec-2-enoate; ethyl N,S-bis(4-oxo-4-(2,6,6-trimethylcyclohex-3-en-1-yl)butan-2-yl)cysteinate; 4-(dodecylthio)-4-methylpentan-2-one; 1-butoxy-3-((1E,4Z)-hepta-1,4-dien-1-yl)benzene; 2-ethoxy-4-((1E,4Z)-hepta-1,4-dien-1-yl)phenol; and mixtures thereof. The use of precursor in this manner provides a washing machine that is free from malodour for a prolonged period.

9 Claims, No Drawings

METHOD OF COUNTERING MALODOUR IN A WASHING MACHINE COMPRISING THE ADDITION OF A FRAGRANCE PRECURSOR

CROSS REFERENCE TO RELATED APPLICATIONS

This application is a continuation application of U.S. application Ser. No. 17/298,374, filed May 28, 2021, which is a national stage application of International Application No. PCT/EP2018/085158, filed 17 Dec. 2018, which applications are incorporated herein by reference in their entireties.

This disclosure relates to fragrance compositions, and more particularly to fragrance compositions for use in washing machines, both for fabrics and dishes/cutlery.

It is a well-known phenomenon that, when a washing machine has finished a wash cycle and has been emptied and left open for a prolonged period, an undesirable odour may emanate from the machine, this resulting from a combination of residual water in the machine and bacteria that have not been killed during the wash cycle. One possibility is to run the machine with a bactericidal preparation, and some washing machine manufacturers have made available such a product.

Another possibility is to run a washing cycle at elevated temperature to destroy the bacteria, but this is wasteful of energy. A further possibility has been the addition of fragrance to mask this odour.

It has now been found that there is a particularly effective counter to this malodour problem without the need for the purchase of special cleaning preparations or additional hot water washes. There is therefore provided a method of countering malodour in a washing machine at the end of a wash cycle, comprising the addition thereto of a fragrance precursor.

By "fragrance precursor" is meant a compound that, under particular circumstances, will break down to provide a fragrant material. The circumstances will depend on the nature of the compound—for example, some precursors will break down in the presence of humidity, others in the presence of oxygen. However, the common factor is that, on breakdown, they produce a fragrant material.

By "at the end of a wash cycle" is meant that part of the wash cycle after the actual detergent wash is completed. This typically includes at least one rinse step, during which step a fabric softener may be introduced. The fragrance precursor may be included with the fabric softener, either as part of a fragrance formulation included in the fabric softener, or it may be added independently to a fabric softener as a solution in a suitable solvent, or as part of a fragrance.

Fragrance precursors are well known in the art, and any suitable fragrance precursor may be used. In a particular embodiment, the fragrance precursor is selected from the class of fragrance precursors that break down under the influence of humidity or in the presence of oxygen. Typical examples of such fragrance precursors may be found in, for example, International Publications WO 2007/143873 and WO 2018/096176 (humidity cleavage), and WO 2012/085287 (oxygen cleavage).

In a particular embodiment the precursor is selected from the group consisting of ethyl (Z)-2-acetyl-4-methyltridec-2-enoate;

ethyl N,S-bis(4-oxo-4-(2,6,6-trimethylcyclohex-3-en-1-yl)butan-2-yl)cysteinate;

4-(dodecylthio)-4-methylpentan-2-one;

1-butoxy-3-((1E,4Z)-hepta-1,4-dien-1-yl)benzene;

2-ethoxy-4-((1E,4Z)-hepta-1,4-dien-1-yl)phenol;

and mixtures thereof.

More than one such precursor may be used, and the use of the singular in the following description also includes the plural. The number and nature of precursors will depend entirely on the extent of the odour counteraction and/or hedonic effect desired.

Certain fragrance precursors provide a surprisingly long-lasting fragrance in the circumstances hereinabove described, such that a washing machine thus treated will remain free of undesirable odour for a prolonged period, six days or more.

The precursor may be used alone, or it may be combined with other common fragrance ingredients to provide a complete fragrance formulation. As the precursors hereinabove defined release aldehydes and/or ketones, highly volatile materials that are what the fragrance industry knows as "top notes", their presence in a perfume formulation must be compensated by an increase in the proportions of "middle notes" and "bass notes", fragrance materials that evaporate more slowly, but whose presence is essential to an overall hedonic effect.

Typical, non-limiting examples of "top note" fragrance materials useful in the compositions of this disclosure include:

ethyl isobutyrate butyl acetate, (+−)-ethyl 2-methylbutanoate, (+)-isopropyl methylbutanoate, (+−)-ethyl 2-methylpentanoate, (2E)-2hexenal 3-methyl-2-buten-1-yl acetate, 2-heptanone methyl hexanoate, 7-methyl-3-methylene-1,6-octadiene, 5-methyl-3-heptanone, (+)-limonene, (+−)-4-methyl-4-penten-2-yl 2-methylpropanoate, (Z)-3-hexenyl formate, 1-methoxy-4-propylbenzene, (+−)-(3-methoxy-2-methylpropyl)benzene, 2-phenylethyl formate, (+−)-2-pentylcyclopentanone, methyl phenylacetate, (+)-(1R)-1,7,7-trimethyl-bicyclo[2.2.1]heptan-2-one, 3-(2,2-dimethylpropyl)pyridine benzyl acetate, cyclohexyl ethyl acetate, ethyl 2-methyl-1,3-dioxolane-2-1-phenyl-1-ethanol, 2-methylpentyl-2-methylpentanoate, (+−)-2-propylheptanenitrile, (+−)-3-mercaptohexyl acetate, (+−)-1,5-dimethyl-1-vinyl-4-hexenyl acetate, (1RS,2RS)-2-(2-methyl-2-propanyl)cyclohexyl acetate, (+)-1-phenylethyl acetate, ethyl 2,6,6-trimethyl-1,3-cyclohexadiene-1-carboxylate, (+−)-1,5-dimethyl-1-vinyl-4-hexenyl acetate, (+−)-3,7 dimethyl-6-octen-1-yl formate, (+−)-ethyl 2-acetyl-4-methyl-4-pentenoate, cis-4-(2-methyl-2-propanyl)cyclohexyl acetate, trans-4-(2-methyl-2-propanyl)cyclohexyl acetate, ethyl phenylacetate, (+−)-2,2,5-trimethyl-5-pentylcyclo-pentanone, methyl (2e)-2-nonenoate, (+−)-2,4-dimethyl-4-phenyltetrahydrofuran, (+−)-3,7-dimethyl-6-octenyl formate, allyl (3-methylbutoxy)acetate, (+−)-allyl (2-methylbutoxy)acetate, hexyl (2E)-2-methyl-2-butenoate, (2RS,5SR)-6-ethyl-2,10,10-trimethyl-1-oxaspiro [4.5]deca-3,6-diene, ((2RS,5SR)-6-ethyl-2,10,10-trimethyl-1-oxaspiro [4.5]deca-3,6-diene, cis-4-(2-methyl-2-propanyl)cyclohexyl acetate, trans-4-(2-methyl-2-propanyl)cyclohexyl acetate, ((3z)-3-hexen-1-yl (3z)-3-hexenoate, (z)-3,7-dimethyl-2,6-octadienal, (e)-3,7-dimethyl-2,6-octadienal, 2-phenylethyl acetate, 1,1-dimethyl-2-phenylethyl acetate, 1-methoxy-4-[(1e)-1-propen-1-yl]benzene, 4-phenyl-2-butanone, 4-methylphenyl isobutyrate, 2-phenylethanol, (1R,4R)-8-mercapto-3-p-menthanone, (+−)-(e)-1-(2,2-dimethyl-6-methylene-1-cyclohexyl)-2-buten-1-one, (2E)-1-[(1RS,2SR)-2,6,6-trimethyl-3-cyclohexen-1-yl]-2-buten-1-one, [2-(1-ethoxyethoxy)ethyl]

benzene, 1,1-bis(2-phenylethoxy)-ethane, 3,7-dimethyl-6-octenyl acetate, 5-methyl-3-heptanone, (2Z)-3,7-dimethyl-2,6-octadien-1-yl acetate, (2E)-1-(2,6,6-trimethyl-1,3-cyclohexadien-1-yl)-2-buten-1-one, 2,4,6-trimethyl-4-phenyl-1,3-dioxane, benzyl propanoate, (+−)-(2e)-1-(2,6,6-trimethyl-2-cyclohexen-1-yl)-2-buten-1-one, ethyl tricyclo[5.2.1.0.(2,6)]decane carboxylate, (+−)-(2e)-1-(2,6,6-trimethyl-2-cyclohexen-1-yl)-2-buten-1-one, 3-methylbutyl-2-phenylethyl ether, (+−)-4-octanolide hexyl hexanoate, (+−)-3,7-dimethyl-1,6-octadien-3-ol, (+−)-3,7-dimethyl-1,6-octadien-3-ol, (e)-4-decenal octyl acetate, (+−)-3,5,6,6-tetramethyl-4-methylidene-2-heptanone, (+−)-(4e)-3,4,5,6,6-pentamethyl-4-hepten-2-one, (+−)-(M3Z)-3,4,5,6,6-pentamethyl-3-hepten-2-one, (+−M3E)-3,4,5,6,6-pentamethyl-3-hepten-2-one, (+−)-(3-methoxy-2-methylpropyl)benzene, 2-phenylethyl formate, (+−)-2-propylheptanenitrile, (+−)-1,5-dimethyl-1-vinyl-4-hexenyl acetate, (+−)-1-phenylethyl-1,5-dimethyl-1-vinyl-4-hexenylacetate, cis-4-(2-methyl-2-propanyl) cyclohexyl acetate, trans-4-(2-methyl-2-propanyl) cyclohexyl acetate, (Z)-3,7-dimethyl-2,6-octadienal, (E)-3,7-dimethyl-2,6-octadienal, (+−)-2,6-dimethyl-5-heptenal, (2E,6Z)-2,6-nonadienal, methyl 2-octynoate, decanal, (+−)-2-methyldecanal, undecanal, dodecanal, 10-undecenal, (9E)-9-undecenal, (9Z)-9-undecenal, 8-isopropyl-6-methyl-bicyclo[2.2.2]oct-5-ene-2-carbaldehyde, (2Z)-3,7-dimethyl-2,6-octadien-1-yl acetate, ethyl isobutyrate, butyl acetate, (+−)-ethyl 2-methylbutanoate, (+)-isopropyl 2-methyl-butanoate, (+−)-ethyl 2-methylpentanoate, (2E)-2-hexenal 3-methyl-2-buten-1-yl acetate, 2-heptanone, methyl hexanoate, 7-methyl-3-methylene-1,6-octadiene, 5-methyl-3-heptanone, (+)-limonene, (+−)-4-methyl-4-penten-2-yl-2-(Z)-3-hexenyl formate, ethyl hexanoate, 3-octanone, (+−)-methyl 2-ethylhexanoate, 2-octanone, (1R,5R)-4,7,7-trimethyl-6-thiabicyclooct-3-ene-(1R,4R,5R)-4,7,7-trimethyl-6-thiabicyclo[3.2.1]octane, (E)-2-hexenyl acetate, 6-methyl-5-hepten-2-one, 1-isobutyl-3-methylbutyl acetate, (+−)-2,6-dimethyl-7-octen-4-one, (2Z)-3-methyl-2-hexen-1-yl acetate, ((2E)-3-methyl-2-hexen-1-yl acetate, 3,7-dimethyl-1,3,6-octatriene, ethyl heptanoate, ethyl 3-oxobutanoate, (2Z)-ethyl 3-hydroxy-2-butenoate, heptyl acetate, 3-methylbutyl butanoate, methylbutyl butanoate, (+−)-4-pentanolide, hexyl acetate, (+−)-2,6-dimethyl-5-heptenal, (3Z)-3-hexen-1-yl butyrate, hexyl 2-methylpropanoate, ethyl (2E)-2,4-dimethyl-2-pentenoate, 3-methylbutanoic acid, (+−H)-pentyl-2-propenyl acetate, (3Z)-hex-3-en-1-yl methyl carbonate, 3,5,5-trimethylhexyl acetate, ethyl benzoate, allyl heptanoate, 1-(3,3-dimethyl-1-cyclohexyl)ethyl formate, (+−)-methyl 2,2-dimethyl-6-methylidenecyclohexanecarboxylate, (Z)-3-hexenyl isobutyrate, (−)-propyl (S)-2-dimethylpropoxy) allyl hexanoate, (+−)-3,7-dimethyl-1,6-octadien-3-ol, (+−)-(Z)-3-hexenyl 2-methylbutanoate, octyl acetate, (+−)-1S,2 3,5,6,6-tetramethyl-4-methylidene-2-heptanone, (+−)-(4e)-3,4,5,6,6-pentamethyl-4-hepten-2-one, 1-methoxy-4-propylbenzene, (+−)-(3-methoxy-2-methylpropyl)benzene, 2-phenylethyl formate, (+−)-2-pentylcyclopentanone, methyl phenylacetate, (+)-(1R)-1,7,7-trimethyl-bicyclo[2.2.1]heptan-2-one, 3-(2,2-dimethyl-propyl)pyridine, benzyl acetate, hexanolide, (+−)-2-pentylcyclopentanone, methyl phenylacetate, 2-cyclohexyl ethyl acetate, ethyl-2-methyl-1,3-dioxolane-2-acetate, 2-hydroxy-3-methyl-2-cyclopenten-1-one, 2-methoxy-4-methylphenol heptanolide, (3Z)-3-hexen-1-yl (2E)-2-methyl-2-butenoate, (3Z)-3-hexen-1-yl (3Z)-3-hexenoate, 2-phenylethyl acetate, hexanoic acid, 1-methoxy-4-[1E)-1-propen-1-yl]benzene phenylethanol, (+−)-(e)-1-(2,2-dimethyl-6-methylene-1-cyclohexyl)-2-buten-1-one, (2E)-1-[(1RS.2SR)-2,6,6-trimethyl-3-cyclohexen-1-yl]-2-buten-1-one, [2-(1-ethoxyethoxy)ethyl]benzene, (1,1-bis(2-phenylethoxy) ethane 5-methyl-3-heptanone oxime, (+−)-(2E)-(2,6,6-trimethyl-2-cyclohexen-1-yl)-2-buten-1-one, 3-methylbutyl-2-phenylethyl ether butyl acetate, (+−)-3-hydroxy-2-butanone, 1-butanol, (+−)-4-methyl-4-penten-2-yl 2-methyl-propanoate, ethyl hexanoate, diallyl disulfide, allyl heptanoate, (+−)-2-pentylcyclopentanone, methyl phenylacetate, 2-cyclohexyl ethyl acetate, ethyl 2-methyl-1,3-dioxolane-2-acetate, (3Z)-3-hexen-1-yl (3Z)-3-hexenoate, 2-phenylethyl acetate, hexanoic acid, 1-methoxy-4-[(1E)-1-propen-1-yl]benzene, 2-phenylethanol, (+−)-(E)-1-(2,2-dimethyl-6-methylene-1-cyclohexyl)-2-buten-1-one, (2E)-1-[(1RS,2SR)-2,6,6-trimethyl-3-cyclohexen-1-yl]-2-buten-1-one, 1,1-bis(2-phenylethoxy)ethane, 5-methyl-3-heptanone oxime, 3-methylbutyl-2-phenylethyl ether, (+−)-4-octanolide, 1-butanol, (+−)-methyl 2-ethylhexanoate, 3-methylbutanoic acid, 6,6-dimethoxy-2,5,5-trimethyl-2-hexene, 4-(2-methyl-2-propanyl)cyclohexanone, (+−)-(3Z)-3,4,5,6,6-pentamethyl-3-hepten-2-one, (1S,2S,4S)-1,7,7-trimethylbicyclo[2.2.1]hept-2-ylpropanoate, (+−)-1-(2-tert-butyl-1-cyclohexyloxy)-2-butanol, (+−)-alpha-terpineol, (+−)-2-ethoxy-2,6,6-trimethyl-9-methylene-bicyclo[3.3.1] nonane, (+−)-(2E)-1-(2,6,6-trimethyl-2-cyclohexen-1-yl)-2-buten-1-one, (+−)-(E)-3-methyl-4-(2,6,6-trimethyl-2-cyclohexen-1-yl)-3-buten-2-one, 3-octanone, (+−)-methyl 2-ethylhexanoate, ethyl acetate, ethyl butanoate, 2-octanone, (E)-2-hexenyl acetate, 6-methyl-5-hepten-2-one, 1-isobutyl-3-methylbutyl acetate, (+−)-2,6-dimethyl-7-octen-4-one, (+−)-3,7-dimethyl-1,6-octadien-3-ol, (+−)-3,7-dimethyl-1,6-octadien-3-ol, 2-phenylethyl formate, (+−)-2-propylheptanenitrile, (+−)-1,5-dimethyl-1-vinyl-4-hexenyl acetate, (+−)-1-phenylethyl acetate, (+−)-1,5-dimethyl-1-vinyl-4-hexenyl acetate, cis-4-(2-methyl-2-(Z)-3,7-dimethyl-2,6-octadienal, (E)-3,7-dimethyl-2,6-octadienal, ethyl butanoate, (+−)-ethyl 2-methylbutanoate, hexanal, (1)-ethyl-2-methyl pentanoate, (−)-(1s9-2,6,6-trimethyl-bicyclo[3,1,1]hept-2-ene, alpha-pinene, beta-pinene, (2e)-2-hexenal, (±)-3-hydroxy-2-butanone, 3-methyl-2-buten-1-yl acetate, methyl hexanoate, (±)-2-ethenyl-2,6,6-trimethyl tetrahydro-2h-furan, heptanal, 1-butanol, ethyl hexanoate, benzaldehyde, (E)-2-hexenyl acetate, (Z)-3-hexenol, 3,7-dimethyl-1,3,6-octatriene, (Z)-3-hexenyl acetate, (+−)-1-octen-3-ol, ethyl 3-oxobutanoate, ethyl 3-hydroxy-2-butenoate, nonanal, dibutyl sulfide, (+−)-1-methoxy-3-hexanethiol, tetrahydro-4-methyl-2-(2-methyl-1-propenyl)-2h-pyran, (Z)-6-nonenal, (+−) ethyl 3-methyl-2-oxopentanoate, 1-hexanol, (+−)-methyl trimethyl-2-cyclohexene-1-carboxylate, (3Z)-hex-3-en-1-yl methyl carbonate, benzyl formate, (3E,5Z)-1,3,5-undecatriene, (2-methoxy-ethyl)benzene, allyl heptanoate, (Z)-3-hexenyl formate, (+−)-(Z)-3-hexenyl 2-ethyl octanoate, 2-methyl-3-hexanone oxime, (2E,6Z)-2,6-nonadienal, (Z)-4-decenal, (+−)-(3-methoxy-2-methylpropyl)benzene, 2-phenylethyl formate, ethyl 2-ethyl-1,3-dioxolane-2-acetate, methyl 2-octynoate, (2,2-dimethoxy-ethyl)benzene, 2-methylpentyl 2-methylpentanoate, (+−)-3,7-dimethyl-3-octanol, (+−)-3-mercaptohexyl acetate, 3-(4,4-dimethyl-1-cyclohexen-1-yl)propanal, 1,1-dimethoxy-2-phenylpropane, (+−)-1,5-dimethyl-1-vinyl-4-hexenyl acetate, (+−)-ethyl 2-acetyl-4-methyl-4-pentenoate, (+−)-(4Z)-4-cycloocten-1-yl, methyl carbonate, methyl (2E)-2-nonenoate, (+−)-2,4-dimethyl-4-phenyltetrahydrofuran, (+−)-3-phenylbutanal, (3Z)-3-hexen-1-yl (3Z)-3-hexenoate, hexanoic acid, 2-methoxy-3-(4-methylpentyl)pyrazine, 2-methoxy-4-propyl-1-cyclohexanol, 4-phenyl-2-butanone, (3Z)-3-hexen-1-yl (2E)-2-methyl-2 butenoate, 8-isopropyl-6-ethyl-bicyclo[2.2.2]oct-5-ene-2-carbaldehyde, 5-methyl-3-heptanone oxime, benzyl propanoate, ethyl tricyclo[5.2.1.0.(2,6)]decane-2-carboxylate, (+−)-(2E)-1-(2,6,6-trimethyl-2-cyclohexen-1-yl)-2-buten-1-one, (±)-isopropyl-2-methylbutanoate, (+)-limonene, 1-methyl-4-(2-propanyl)-1,4-cyclohexadiene, (±)-2,6-dimethyl-7-octen-4-one, heptyl acetate, nonanal, (±)-4-pentanolide, 1-(3,3-dimethyl-1-cyclohexyl)ethyl formate, ethyl acetate, butyl acetate, (±)-3-hydroxy-2-butanone, 2-furanmethanethiol, 1-butanol, diallyl disulphide, 1-phenylethanone, allyl heptanoate, ethyl hexanoate and benzaldehyde, Typical, non-limiting examples of "middle note" fragrance materials useful in the compositions of this disclosure include:

methyl 2-nonynoate, 7-methyl-2H-1,5-benzodioxepin-3(4H)-one, (+−)-tetrahydro-2-isobutyl-4-methyl-4(2H)-pyranol, (+−)-2-methylundecanal, 7-methyl-2hH1,5-benzodioxepin-3(4H)-one, 7-isopropyl-2H,4H-1,5-benzodioxepin-3-one, dodecanenitrile, (2e,6z)-2,6-nonadien-1-ol, 4-methoxy-benzaldehyde, 4 methyl 2-nonynoate, (4-methylphenoxy) acetaldehyde, 7-methyl-2H-1,5-benzodioxepin-3(4H)-one, (e)-3,7-dimethyl-2,6-octadienyl acetate (+−)-(3E)-4-(2,6,6-trimethyl-2-cyclohexen-1-yl)-3-buten-2-one, (+−)-(e)-4-methyl-3-decen-5-ol, 6(8)-isopropylquinoline, 1-phenyl-2-(1-propoxyethoxy)ethane, (+−)-1,3-dimethyl-3-phenylbutyl acetate, 1-(4-methoxyphenyl)-1-ethanone, 3-hydroxy-2-methyl-4(4H)-pyranone, (2e)-1-(2,6,6-trimethyl-1,3-cyclohexadien-1-yl)-2-buten-1-one, (e)-3,7-dimethyl-2,6-octadienyl acetate, (2e)-1-(2,6,6-trimethyl-1-cyclohexen-1-yl)-2-buten-1-one, 4-cyclohexyl-2-methyl-2-butanol, (e)-3,7-dimethyl-2,6-octadienyl acetate, allyl 3-cyclohexylpropanoate, 2-phenylethyl pivalate, 2-phenylethyl isobutyrate, (+−)-(e)-4-methyl-3-decen-5-ol, benzyl 3-methylbutanoate, ethyl (e)-3-phenyl-2-propenoate, (+−)-6-propyltetrahydro-2h-pyran-2-one, (+−)-1,3-dimethyl-3-phenylbutyl acetate, 3,7-dimethyl-2,6-octadien-1-ol, (e)-3,7-dimethyl-2,6-octadien-1-ol, (e)-3,7-dimethyl-2,6-octadien-1-ol, (z)-3,7-dimethyl-2,6-octadien-1-ol, 4-cyclohexyl-2-methyl-2-butanol, (+−)-3,7-dimethyl-1-octanol, 3,7-dimethyl-2,6-octadien-1-ol, (+−)-6-propyltetrahydro-2h-pyran-2-one, allyl 3-cyclohexylpropanoate, (3S,3aS,6R,7aR)-3,6-dimethyl-hexahydro-1-benzofuran-2(3H)-one, 2-phenylethyl 2-phenylethyl isobutyrate, 1-oxaspiro [4.5]decan-2-one, benzo[d][I,3] dioxole-5-carbaldehyde, 3-methyl-2-[(2Z)-2-penten-1-yl]-2-cyclopenten-1-one, 2-methoxynaphthalene, (2e)-1-(2,6,6-trimethyl-1,3-cyclohexadien-1-yl)-2-buten-1-one, (5rs,6rs)-2,6,10,10-tetramethyl-1-oxaspiro[4.5]decan-6-ol, 2-tert-butyl-dimethoxy-benzene (2e)-11(2,6,6-trimethyl-1-cyclohexen-1-yl)-2-buten-1-one, (e)-3-phenyl-2-propenal, (e)-3-phenyl propenenitrile, 4-(2,6,6-trimethyl-1-cyclohexen-1-yl)-2-butanone, and 2-(6,6-dimethyl-bicyclo[3.1.1]hept-2-en-2-yl)ethyl acetate.

Typical, non-limiting examples of "bass note" fragrance materials useful in the compositions of this disclosure include:

7-methyl-2H-1,5-benzodioxepin-3(4H)-one, (+−)-1-methyl-4-(4-methyl-3-pentenyl)-3-cyclohexene-1-carbaldehyde, (+−)-3-(4-isopropylphenyl)-2-methylpropanal, (+−)-3-(4-methoxyphenyl)-2-methylpropanal, (+−)-2,6,10-trimethyl-9-undecenal, 1,5,9-trimethyl-4,8-decadienyl acetate, (+−)-3-(3-isopropyl-1-phenyl) butanal, (+−)-2-methyl-3-[4-(2-methyl-2-propanyl) phenyl]propanal, (+−)-7-hydroxy-3,7-dimethyloctanal, (z)-6-nonen-1-ol, 8(9)-methoxy-tricyclo[5.2.1.0(2,6)] decane-3(4)-carbaldehyde, (+−)-2,5-dimethyl-2-indan-methanol, 7-propyl-2H,4H-1,5-benzodioxepin-3-one, 7-(2-methyl-2-propanyl)-2H-1,5-benzodioxepin-3 (4H)-one, (+−)-3-(1,3-benzodioxol-5-yl)-2-methylpropanal, methyl 2,4-dihydroxy-3,6-dimethylbenzoate, 2-ethyl-3-hydroxy-4(4H)-pyranone, allyl (cyclohexyl oxy)acetate, 1-(5,5-dimethyl-1-cyclohexen-1-yl)-4-penten-1-one, (+−)-2-phenylethyl-2-methyl-butanoate, ethyl (2e,4z)-2,4-decadienoate, (+−)-3,4'-dimethylspiro [oxirane-2,9'-tricyclo[6.2.1.0-2,7~]undec[4]ene, (+−)-(e)-3-methyl-4-(2,6,6-trimethyl-2-cyclohexen-1-yl)-3-buten-2-one, 1,1-dimethyl-2-phenylethyl butanoate, benzyl (e)-2-methyl-2-butenoate, (+−)-4-nonanolide, 9-decen-1-ol, ethyl (2e)-2,4,7-decatrienoate, 5-nonanolide, ethyl (e)-3-phenyl-2-propenoate, (e)-3-phenyl-2-propenyl acetate, 4-methoxybenzyl acetate, 1,5,9-trimethyl-4,8-decadienyl acetate, ethyl 2,3-epoxy-3-phenylbutanoate, (+−)-2,2,2-trichloro-1-phenylethyl acetate, (3z)-3-hexen-1-yl benzoate, (+−)-4-decanolide, 2-phenoxyethyl 2-methylpropanoate, allyl phenoxyacetate, (+−)-6-pentyltetrahydro-2H-pyran-2-one, (e)-3-phenyl-2-propenyl propanoate, 8(9)-methoxy-tricyclo[5.2.1.0(2,6)]decane-3(4)-carbaldehyde, 4-(4-methoxyphenyl)-2-butanone, 6-hexyltetrahydro-2H-pyran-2-one, (+)-(1S,I'R)-2-[1-(3',3'-dimethyl-1'-cyclohexyl) ethoxy]-2-methylpropyl propanoate, (+)-(1S,2S,3S,5R)-2,6,6-trimethylspiro [bicyclo[3.1.1] heptane-3,1'-cyclohexane]-2'-en-4'-one, hexyl 2-hydroxybenzoate, (+−)-5-heptyldihydro-2(3H)-furanone, (1'R)-2-[2-(4'-methyl-3'-cyclohexen-1'-yl)propyl]-cyclopentanone, (e)-2-methoxy-4-(1-propenyl) phenyl acetate, (+−)-4,6,6,7,8,8-hexamethyl-1,3,4,6,7,8-hexahydrocyclopenta[g]isochromene, methyl {(IRS, 2RS)-3-oxo-2-[(2z)-2-penten-1-yl] cyclopentyl}acetate, (+−)-5-octyldihydro-2(3H)-furanone, (2e)-2-benzylideneoctanal, 4-formyl-2-methoxyphenyl 2-methylpropanoate, (+−)-6-heptyltetrahydro-2H-pyran-2-one, benzyl benzoate (10e)-oxacycloheptadec-10-en-2-one, (e)-2-pentyl-3-phenyl-2-propenal, 4-(4-hydroxy-1-phenyl)-2-butanone, 2-phenylethyl phenylacetate, 9-decen-1-ol, 2-ethoxynaphthalene, (+−)-2,2,2-trichloro-1-phenylethyl acetate, (3z)-3-hexen-1-yl benzoate, 8(9)-methoxy-tricyclo[5.2.1.0(2,6)]decane-3(4)-carbaldehyde, (+−)-(3,7-dimethyl-6-octenyloxy)acetaldehyde, (+−)-(3,7-dimethyl-6-octenyloxy) acetaldehyde, hexyl 2-hydroxybenzoate, methyl 2-((1RS,2RS)-3-oxo-2-pentylcyclopentyl)acetate, (e)-2-methoxy-4-(1-propenyl)phenyl acetate, benzyl benzoate, (10e)-oxacycloheptadec-10-en-2-one, (e)-2-pentyl-3-phenyl-2-propenal, 2-phenylethyl phenylacetate, (+−)-7-methoxy-3,7-dimethyl-2-octanol, (3e)-4-(2,6,6-trimethyl-1-cyclohexen-1-yl)-3-buten-2-one, benzyl (e)-2-methyl-2-butenoate, 1,2,3,5,6,7-hexahydro-1,1,2,3,3-pentamethyl-4-indenone, (e)-3-methyl-trimethyl- 3-cyclopenten-1-yl)-4-penten-2-ol, 5,5,8a-trimethyldecahydro-2-naphthalenyl acetate, (2RS,4aRS,8aRS)-5,5,8a-trimethyldecahydro-2-naphthalenyl acetate, (+−)-3,6,8,8-tetramethyloctahydro-1H-3a,7-methanoazulen-6-ol, 3aRS,5aSR,9aSR, 9bSR)-3a,6,6,9a-tetramethyldodecahydronaphtho [2,1-b]furan, 1RS,6RS, 11RS)-2,2,9,11-tetramethylspiro [5.5]undec-8-en-1-yl acetate, (−)-(3aR,5aS,9aS,9bR)-3a,6,6,9a-tetramethyldodecahydronaphtho [2,I-b]furan, (ethoxymethoxy)cyclododecane, (+−)-3-methyl-5-(2,2,3-trimethyl-3-cyclopenten-1-yl)-2-pentanol, (+−)-(1-ethoxyethoxy) cyclododecane, (+)-(1R,7R)-10,10-dimethyl-tricyclo [7.1.1.0(2,7)]undec-2-en-4-one, (+)-(1S,2S,3S,5R)-2, 6,6-trimethylspiro bicyclo-[3.1.1]heptane-3,1'-cyclohexane]-2'-en-4'-one, 2-(2,4-dimethyl-3-cyclohexen-1-yl)-5-methyl-5-(1-methylpropyl)-1,3-dioxane, (+−)-2-ethyl-4-(2,2,3-trimethyl-3-cyclopenten-1-yl)-2-buten-1-ol, (+−)-I1(2,2,3,6-tetramethyl-cyclohexyl)-3-hexanol, (−)-(2e)-2-ethyl-4-[(1R)-2,2,3-trimethyl-3-cyclopenten-1-yl]-2-buten-1-ol, 1-[(1RS,6SR)-2,2,6-trimethylcyclohexyl]-3-hexanol, (−)-(3aR,5aS,9aS,9b,R)-3a,6,6,9a-tetramethyldodecahydronaphtho [2,1-b]furan, (−)-(3aR,5aS,9aS,9b,R)-3a,6,6,9a-tetramethyldodecahydronaphtho [2,1-b]furan, (1'S, 3'R)-{1-methyl-2-[(1',2',2'-trimethyl-bicyclo[3.1.0] hex-3-yl)methyl]cyclopropyl}methanol, and (+)-methyl (1R)-cis-3-oxo-2-pentyl-1-cyclopentane acetate In a particular embodiment, when used as part of a fragrance formulation, the fragrance precursor is present at a proportion of from 0.1% to 30% by weight of the formulation. In a particular embodiment, it is present in the proportion of from 0.5-20%, more particularly from 0.5-17%, and even more particularly from 5-17% and even more particularly from 15-17%. These proportions are valid also for blends of precursors.

In particular embodiments, the precursor is selected from ethyl (Z)-2-acetyl-4-methyltridec-2-enoate and a blend of ethyl (Z)-2-acetyl-4-methyltridec-2-enoate with ethyl N,S-bis(4-oxo-4-(2,6,6-trimethylcyclohex-3-en-1-yl)butan-2-yl) cysteinate. In the blend, the weight ratio of ethyl (Z)-2-acetyl-4-methyltridec-2-enoate to ethyl N,S-bis(4-oxo-4-(2,6,6-trimethylcyclohex-3-en-1-yl)butan-2-yl)cysteinate is from 5:1 to 20:1, particularly from 8:1 to 10:1.

In a further particular embodiment, the fragrance precursor may be added as part of a fragrance formulation, but not as a component of a washing product such as a fabric conditioner/softener. Alternatively, it may be added separate from a perfume formulation, typically as a solution in a suitable solvent, such as dipropylene glycol, isopropyl myristate, triethyl citrate (TEC), pentane-1.2-diol, and ethanol. Such a solution (or a fragrance, in the case of addition as part of a fragrance) will typically contain from 10% to 80 weight % precursor. The quantity of precursor solution is entirely dependent on individual taste, but a typical quantity of solution in an average-sized washing machine will deliver the same proportion of precursor as would a precursor-containing perfume formula in a standard dose of fabric softener added to a washing machine, the fabric softener typically containing from 1-2% by weight of fragrance.

The disclosure is further described with reference to the following example, which describes a particular embodiment, and which is not intended to be in any way limiting.

EXAMPLE: FRAGRANCE SUITABLE FOR FABRIC SOFTENER

| Compound/Ingredient | parts by weight 1/1000 |
|---|---|
| AGRUMEX (2-TERT-BUTYLCYCLOHEXYL ACETATE) | 30 |
| DODECANAL | 2 |
| 2-METHYLUNDECANAL | 1 |
| AMBROFIX (3A,6,6,9A-TETRAMETHYL-DODECAHYDRONAPHTHO[2,1-B]FURAN) | 5 |
| BENZYL ACETATE | 20 |
| CASHMERAN (6,7-DIHYDRO-1,1,2,3,3-PENTAMETHYL-4(5H)-INDANONE) | 10 |
| CITRONELLOL | 40 |
| CYCLOGALBANATE (2-PROPENYL (CYCLOHEXYLOXY)ACETATE) | 5 |
| DAMASCONE DELTA (1-(2,6,6-TRIMETHYL-3-CYCLOHEXEN-1-YL)-2-BUTEN-1-ONE) | 10 |
| DIHYDRO MYRCENOL (2,6-DIMETHYL-7-OCTEN-2-OL) | 80 |
| ETHYL VANILLIN (3-ETHOXY-4-HYDROXYBENZALDEHYDE) | 15 |
| GARDENOL (1-PHENYLETHYL ACETATE) | 5 |
| GERANIOL (2-TRANS-3,7-DIMETHYL-2,6-OCTADIEN-1-OL) | 30 |
| GERANYL ACETATE (3,7-DIMETHYLOCTA-2,6-DIENYL ACETATE) | 15 |
| HEDIONE (METHYL 3-OXO-2-PENTYLCYCLOPENTANEACETATE) | 60 |
| HEXYL ACETATE | 15 |
| HEXYL CINNAMIC ALDEHYDE (2-HEXYL-3-PHENYL-2-PROPENAL) | 60 |
| HEXYL SALICYLATE (HEXYL 2-HYDROXYBENZOATE) | 90 |
| IONONE BETA (4-(2,6,6-TRIMETHYL-1-CYCLOHEXEN-1-YL)-3-BUTEN-2-ONE) | 15 |
| ISO E SUPER (2-ACETYL-1,2,3,4,5,6,7,8-OCTAHYDRO-2,3,8,8-TETRA-METHYLNAPHTALENE | 50 |
| JASMACYCLENE (3A,4,5,6,7,7A-HEXAHYDRO-4,7-METHANO-1-INDEN-5(6)-YL ACETATE) | 30 |
| JAVANOL[1)] | 5 |
| LAVANDIN GROSSO OIL | 30 |
| MANZANATE (ETHYL 2-METHYLPENTANOATE) | 4 |
| MEFROSOL (3-METHYL-5-PHENYL-1-PENTANOL) | 30 |
| METHYL ANTHRANILATE(METHYL 2-AMINOBENZOATE) | 5 |
| NEROLINE CRYSTALS (NAPHTALENE, 2-ETHOXY-) | 15 |
| NYMPHEAL (3-(4-ISOBUTYL-2-METHYLPHENYL)PROPANAL) | 20 |
| PATCHOULI OIL | 10 |
| PEACH PURE (4-UNDECANOLIDE) | 15 |
| PEONILE (2-CYCLOHEXYLIDENE-2-PHENYLACETONITRILE) | 40 |
| PETALIA (CYCLOHEXYLIDENE-O-TOLYL-ACETONITRILE) | 15 |
| PHENYL ETHYL ACETATE (2-PHENYLETHYL ACETATE) | 5 |
| PHENYL ETHYL ALCOHOL (2-PHENYLETHANOL) | 40 |
| RADJANOL[2)] | 30 |
| RASPBERRY KETONE (4-(4-HYDROXYPHENYL)-2-BUTANONE) | 5 |
| ROSE OXIDE (4-METHYL-2-(2-METHYL-1-PROPENYL)TETRAHYDRO-2H-PYRAN) | 3 |
| ROSYFOLIA ((1-METHYL-2-(5-METHYLHEX-4-EN-2-YL)CYCLOPROPYL)METHANOL) | 10 |
| TRICYCLAL (2,4-DIMETHYL-3-CYCLOHEXENE-1-CARBALDEHYDE) | 5 |
| UNDECAVERTOL (4-METHYL-3-DECEN-5-OL) | 15 |
| DIPROPYLENE GLYCOL | 110 |
| Total: | 1000 |

[1)]Javanol = ((1-METHYL-2-(1,2,2-TRIMETHYLBICYCLO(3.1.0)-HEX-3-YLM-ETHYL)-CYCLOPROPYL)METHANOL)
[2)]Radjanol = 2-ETHYL-4-(2,2,3-TRIMETHYL-3-CYCLOPENTEN-1-YL)-2-BUTEN-1-OL This accord was characterized as having a fresh, floral fruity character. This was designated Accord 1.

A fragrance accord was created by replacing 70 parts of the DPG of this accord above by ethyl (Z)-2-acetyl-4-methyltridec-2-enoate. This was designated Accord 2.

A third accord was prepared by replacing the DPG completely with an equal amount of a blend of ethyl (Z)-2-acetyl-4-methyltridec-2-enoate (60 parts), ethyl N,S-bis(4-oxo-4-(2,6,6-trimethylcyclohex-3-en-1-yl)butan-2-yl) cysteinate (40 parts) and 4-(dodecylthio)-4-methylpentan-2-one (10 parts). This was designated Accord 3.

All of these accords were incorporated into samples of a fabric softener base at a dosage of 1.5% by weight, and each of these fabric softeners was then tested in the wash cycles described below. The fabric softener samples were prepared one day before testing.

In order to emulate the operation of a normal washing machine in everyday use, 11 washes were made with a washing load consisting of one towel and 4 T-shirts, two 5% polyester and two 100% polyester. The cycle was 38 minutes at 30° C. with a spin of 1200 rpm. 4 washes per day were performed. The machine door was left partially open for 1 hour before the next wash.

On the third day, when the washed had been completed, the odour in the machine was assessed by trained perfumers, who gave an assessment of the perfume odour on a scale of from 0 (no perfume odour) to 5 (very strong perfume odour).

The results, with tester comments, were as follows:

Accord 1—average score 1.75—not very strong, less fresh, less powerful, less pleasant Accord 2—average score 4—more chypre, aldehydic, cleaner odour, stronger, more pleasant Accord 3—average score 3—floral, rosy, softer, original fragrance detectable.

The fabric softener with only ethyl (Z)-2-acetyl-4-methyltridec-2-enoate added to the fragrance gave the best results, not only from a durability standpoint, but also from an olfactory standpoint.

The invention claimed is:

1. A method of countering malodor in a washing machine at the end of a wash cycle, the method comprising adding a fragrance composition to a wash, the fragrance composition comprising at least two compounds selected from the group consisting of:

a) ethyl (Z)-2-acetyl-4-methyltridec-2-enoate;

b) ethyl N,S-bis(4-oxo-4-(2,6,6-trimethylcyclohex-3-en-1-yl) butan-2-yl) cysteinate;

c) 4-(dodecylthio)-4-methylpentan-2-one;

d) 1-butoxy-3-((1E,4Z)-hepta-1,4-dien-1-yl)benzene; and e) 2-ethoxy-4-((1E,4Z)-hepta-1,4-dien-1-yl) phenol.

2. The method according to claim 1, in which the at least two compounds are added in the form of a solution in a solvent.

3. The method according to claim 1, in which the at least two compounds are added as part of a fragrance formulation.

4. The method according to claim 3, in which the fragrance forms part of a fabric conditioner/softener formulation.

5. The method according to claim 1, in which the at least two compunds are selected from the group consisting of a blend of ethyl (Z)-2-acetyl-4-methyltridec-2-enoate with ethyl N,S-bis(4-oxo-4-(2,6,6-trimethylcyclohex-3-en-1-yl) butan-2-yl)cysteinate.

6. The method according to claim 5, in which the weight ratio of ethyl (Z)-2-acetyl-4-methyltridec-2-enoate to ethyl N,S-bis(4-oxo-4-(2,6,6-trimethylcyclohex-3-en-1-yl)butan-2-yl)cysteinate is from 5:1 to 20:1.

7. The method according to claim 6, in which the weight ratio is from 8:1 to 10:1.

8. The method according to claim 2, in which the weight proportion of the at least two compounds in the solution is from 10-80% by weight.

9. The method according to claim 2, in which the at least two compounds are added as part of a fragrance formulation.

* * * * *